United States Patent
Ohga et al.

(10) Patent No.: US 6,807,823 B2
(45) Date of Patent: Oct. 26, 2004

(54) FLUORINE-CONTAINING GLASS

(75) Inventors: Yuichi Ohga, Kanagawa (JP); Tadashi Enomoto, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/298,924

(22) Filed: Nov. 19, 2002

(65) Prior Publication Data

US 2003/0096693 A1 May 22, 2003

Related U.S. Application Data

(62) Division of application No. 09/921,137, filed on Aug. 3, 2001, now abandoned.

(30) Foreign Application Priority Data

Aug. 4, 2000 (JP) ........................................ 2000-237361
Jun. 22, 2001 (JP) ........................................ 2001-189837

(51) Int. Cl.$^7$ ................................................ C03C 3/06
(52) U.S. Cl. .......................... 65/30.1; 65/32.1; 65/111; 501/54
(58) Field of Search .............................. 501/54; 65/397, 65/414, 424, 30.1, 32.1, 111

(56) References Cited

U.S. PATENT DOCUMENTS

| | | | |
|---|---|---|---|
| 4,988,162 A | 1/1991 | Hayami | ...................... 385/116 |
| 5,335,306 A | 8/1994 | Takita et al. | ................. 385/115 |
| 5,474,589 A | 12/1995 | Ohga et al. | |
| 5,679,125 A | 10/1997 | Hiraiwa et al. | ............... 65/17.3 |
| 5,914,202 A | 6/1999 | Nguyen et al. | |
| 5,936,707 A | 8/1999 | Nguyen et al. | |
| 5,976,968 A | 11/1999 | Dai | |
| 5,983,673 A | 11/1999 | Urano et al. | .................. 65/30.1 |
| 6,174,801 B1 | 1/2001 | Tzu et al. | |
| 6,180,512 B1 | 1/2001 | Dai | |
| 6,242,136 B1 | 6/2001 | Moore et al. | ................... 430/5 |
| 6,265,115 B1 | 7/2001 | Berkey et al. | ............... 428/426 |
| 6,451,719 B1 * | 9/2002 | Yamagata | ..................... 501/54 |

FOREIGN PATENT DOCUMENTS

JP 03177329 A 8/1991

OTHER PUBLICATIONS

IBM Technical Disclosure Bulletin, vol. 21, No. 12, May 1979, "Multi-density Mask", O.R. Abolafia and F. G. Mayko; p. 4788.
IBM Technical Disclosure Bulletin, vol. 21, No. 12, May 1979, "Fabrication of single-level Masking Structure", K.Y. Ahn and B. J. Lin, pp 5066–5067.

* cited by examiner

*Primary Examiner*—David Sample
(74) *Attorney, Agent, or Firm*—McDermott Will & Emery LLP

(57) ABSTRACT

A process for producing fluorine-containing glass. An $SiO_2$ soot is synthesized by hydrolyzing $SiCl_4$. The soot is heated in a chlorine-compound-free atmosphere containing a fluorine compound gas to form a fluorine-containing silica glass. The glass contains not more than 10 ppm OH group, not more than 10 ppm Cl, and not less than 1,000 ppm F. The concentration ratio of F/Cl is 10,000 or more.

2 Claims, 3 Drawing Sheets

FLUORINE-CONTAINING GLASS

This application is a division of application Ser. No. 09/921,137, filed Aug. 3, 2001, now abandoned.

FIELD OF THE INVENTION

The present invention relates to fluorine-containing glass and, more particularly, is to provide a glass composition having improved transmittance in the UV region.

BACKGROUND OF THE INVENTION

Synthetic silica glass articles have widely been used as optical parts and materials for optical transmission media such as optical fibers and optical wave guides, devices using various optical sources and working machines based on their excellent properties that they are transparent for radiation of a wide wavelength range covering UV region and vacuum UV region as well as near infrared region and visible region (which means they suffer less transmission loss), that they have enough resistance against change in temperature, and that they have a smaller linear expansion coefficient and an enough corrosion resistance. However, pure silica glass has a problem that they generate a new absorption band upon being irradiated with high energy UV rays, resulting in reduction in transmittance, change in refractive index and generation of fluorescent light.

In addition, in the use of semiconductor-manufacturing apparatus, LCD substrates and substrates for photomask, a much more improved heat resistance is being required for silica glass. For example, JP-A-5-97466 (Literature 1) (The term "JP-A" as used herein means an "unexamined published Japanese patent application") proposes, as glass containing less contents of water and halogen and having a high heat resistance, dehydrated glass containing 90% by weight or more of silica, 1 ppm or less of aluminum, 100 ppm or less of water and 100 ppm or less of chlorine and having an annealing point of 1150° C. or higher, and a process for producing the dehydrated glass utilizing microwave heating.

There has been fluorine-containing glass having a refractive index and a viscosity decreased by adding fluorine to pure quartz (synthetic silica glass), and it is known that the above-described problem with respect to UV transmittance can be solved by the addition of fluorine.

For example, JP-A-11-305419 (Literature 2) proposes synthetic silica glass containing 1000 ppm or more of OH group, 50 ppm or less of chlorine and 300 ppm or more of fluorine, and synthetic silica glass containing 100 ppm or less of OH group and 100 to 30000 ppm of fluorine, as glasses showing a high transmittance for radiation of a short wavelength region and a good UV ray resistance.

As one use of the synthetic silica glass under irradiation with UV rays, there is a use as a material for photomask substrate to be subjected to a photo-lithography process wherein an integrated circuit pattern is formed on a wafer upon manufacturing LSI. In recent years, with an increase in degree of integration and performance of LSIs, a technology of forming patterns with a finer line width of 0.2 µm or less has been required, and thus light sources for exposure to be used in steppers for lithography, which are capable of emitting shorter wavelength radiation, having been intended to develop.

That is, it has been demanded that the light source be changed so as to provide shorter wavelength radiation, from conventional g-line emitted from a mercury lamp (436 nm in wavelength) to i-line (365 nm), KrF excimer laser (248 nm) and ArF excimer laser (193 nm), and further to a low-pressure mercury lamp (185 nm), ArCl excimer laser, ArCl excimer lamp (175 nm), $Xe_2$ excimer laser and $Xe_2$ excimer lamp (172 nm) and $F_2$ laser (157.6 nm).

However, pure silica glass ($SiO_2$) per se scarcely transmits $F_2$ laser (157.6 nm in wavelength), though it can be used to the level of ArF excimer laser (193 nm). Even the synthetic silica glasses having an adjusted composition as described in the foregoing Literatures 1 and 2 are still insufficient as to UV ray transmittance and laser resistance in the vacuum UV ray region of 200 nm or less such as the wavelength of $F_2$ laser radiation. Hence, it has been urged to develop synthetic silica glass having sufficient transmittance for UV rays with a much higher energy and UV ray resistance.

SUMMARY OF THE INVENTION

The present invention has been made in view of the foregoing problems.

Accordingly, an object of the present invention is to provide fluorine-containing silica glass which has a high UV ray-transmitting characteristic in a UV region of 200 nm or less in wavelength (vacuum UV region) such as a $F_2$ laser radiation and has sufficient UV ray resistance.

Other objects and effects of the present invention will become apparent from the following description.

According to a recent report, "Dry & F doped Fused Silica", so-called "OH group-free, F-doped silica glass", is believed to be the best material as a material adapted for $F_2$ laser radiation ("Concerning photomasks adapted for $F_2$ laser" by Hiroki Jinbo, Optical Alliance, vol. 11, No. 4, pp. 20 to 25, published by Nikkan Kogyo Shuppan in year 2000: Literature 3). However, investigation of the present inventors revealed that, even the concentration of OH group is at a low level the glass fails to have sufficient transmittance and laser resistance when the concentration of fluorine is at a low level.

As a result of extensive investigation on glass compositions, the inventors found that transmittance properties in a vacuum UV region of 200 nm or less and laser resistance can be improved by adjusting contents and content ratio to such specific ranges that OH group content is 10 ppm or less, Cl content is 10 ppm or less, and F content is 1000 ppm or more, with F/Cl ratio being 100 or more. The present invention is based on this finding.

That is, the above-described objects of the present invention have been achieved by providing the following fluorine-containing glasses.

(1) Fluorine-containing glass which comprises silica and contains, in said silica, not more than 10 ppm of OH group, not more than 10 ppm of Cl and not less than 1000 ppm of F, said fluorine-containing glass having a concentration ratio of F/Cl of 100 or more.

(2) Fluorine-containing glass which contains not more than 10 ppm of OH group, not more than 10 ppm of Cl and not less than 1000 ppm of F, and has a concentration ratio of F/Cl of 1000 or more.

(3) Fluorine-containing glass which contains not more than 10 ppm of OH group, not more than 1 ppm of Cl and not less than 1000 ppm of F, and has a concentration ratio of F/Cl of 10000 or more.

The reasons why transmittance properties in the vacuum UV region and laser resistance can be improved by the constitution of the invention may be considered as follows.

It is considered that the structure of the fluorine-containing glass is fundamentally based on $SiO_{1.5}F$ structure ($3SiO_2 + SiF_4 \rightarrow 4SiO_{1.5}F$). That is, the fluorine-containing glass is considered to have the structure wherein Si is partly ended with F.

In order to ensure 80% or more transmittance at wavelengths in the vacuum UV region, particularly at 157 nm which is the wavelength of excimer laser and to obtain enough resistance against a $F_2$ laser, it is considered to be necessary to sufficiently replace the bonds such as Si—OH, Si—Cl and Si—Si by Si—F bond having a higher bond energy.

In the invention, portions of glass ended with F (Si—F) are increased by decreasing the Cl content, increasing the F content, and adjusting the concentration ratio of F/Cl to 100 or higher, thus transmittance in the UV region and laser resistance being improved.

DETAILED DESCRIPTION OF THE INVENTION

Figure 1:
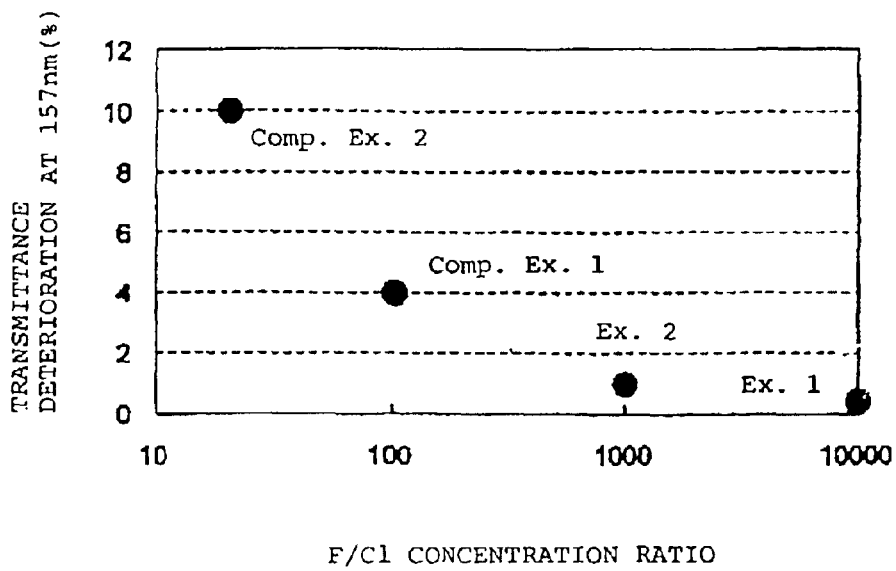
FIG. 1 is a graph showing the relation between the F/Cl concentration ratios of the glass samples obtained in Examples 1 and 2 and Comparative Examples 1 and 2, and the degrees of deterioration in transmittance (%) after irradiation with a $F_2$ excimer laser (157 nm in wavelength)

The OH group concentration in the glass of the invention is adjusted to be 10 ppm or less. If it exceeds 10 ppm, there results a serious absorption loss in the UV region, thus transmittance being decreased.

The concentration of OH group is preferably minimized. However, glass is generally produced by depositing glass fine particles which are generated by hydrolysis reaction or oxidation reaction of glass-forming gases in a flame (so-called VAD method or OVD method), and hence OH group is unavoidably formed in the glass during the glass-synthesizing step. As a step for removing the OH groups (dehydration), the glass is heat-treated in a Cl-containing inert gas atmosphere and, as a result, Si—Cl bond is formed in the glass. However, it is not desirable that the concentration of Cl increases too much in order for removing the OH group. Thus, the upper limit of acceptable OH group concentration is 10 ppm.

In the invention, the concentration of Cl in the glass is adjusted to be 10 ppm or less. As is described above, if the Cl concentration exceeds 10 ppm, a sufficiently high UV ray transmittance and high laser resistance cannot be obtained. On the other hand, dehydration conditions that make the glass free from Cl leave too much amount of OH group. Thus, the acceptable upper limit of the Cl concentration is 10 ppm. Adjusting the Cl concentration in the glass to less than 10 ppm can be achieved by, for example, keeping at a low level the Cl concentration of the atmosphere in which the glass is heat-treated to dehydrate. However, it is also necessary at the same time that the amount of residual OH groups is controlled to 10 ppm or less.

In the invention, the F concentration in the glass is adjusted to be 1000 ppm or more, with F/C ratio (by concentration) being 100 or more, more preferably 1000 or more.

By introducing F in such a large amount, the bonds of Si—OH and Si—Cl formed in the synthesizing step and the dehydrating step can be converted into Si—F bond having a higher bond energy, which serves to obtain a high UV ray transmittance and enough laser resistance. The upper limit of the F concentration is about 30,000 ppm, because this level is the maximum value obtainable by a fluorine-consolidating method at ordinary temperature (sooting-consolidating in an atmosphere of 100% F).

As is shown in Examples and Comparative Examples described below, a degree of deterioration in transmittance after irradiation with a $F_2$ laser is represented as follows.

Degree of deterioration of transmittance (%)=$(T_0-T_1)/T_0 \times 100$ wherein
$T_0$ represents a transmittance before irradiation with the $F_2$ laser and is taken as 100%, and
$T_1$ represents a transmittance after irradiation.

In order to control the degree of transmittance deterioration after irradiation with radiation of a wavelength of 157 nm to a level of <5%, it is necessary to adjust the F/Cl concentration ratio to be $\geq 100$, the OH concentration to be $\leq 10$ ppm, the Cl concentration to be $\leq 10$ ppm and the F concentration to be $\geq 1000$ ppm.

Further, to adjust the degree of transmittance deterioration to 1%, it is necessary to control the F/Cl concentration ratio to be $\geq 1000$, the OH concentration to be $\leq 10$ ppm, the Cl concentration to be $\leq 10$ ppm and the F concentration to be $\geq 1000$ ppm.

In producing the fluorine-containing glass of the invention, raw materials of glass such as $SiCl_4$, $HSiCl_3$, $CH_3SiCl_3$, $(CH_3)_2SiCl_2$, $CH_3Si(CH_3O)_3$ and $Si(OCH_3)_4$ and, if necessary, an inert gas are introduced into a flame comprising a fuel gas such as hydrogen ($H_2$) or a hydrocarbon such as $CH_4$ and a combustion-aiding gas such as oxygen to cause flame hydrolysis reaction of the raw materials in the flame, and glass fine particles ($SiO_2$) thus produced are deposited to obtain a glass fine particle deposit body.

In order to attain the OH group amount according to the invention, conditions in the steps of synthesizing and depositing glass fine particles are adjusted so that OH group is difficultly introduced into the glass. For this purpose, the synthesis of the glass fine particles is carried out by controlling the flow rate of the fuel gas such as hydrogen and the combustion-aiding gas such as oxygen fed to a burner for synthesis so as to minimize the amount of OH group in the resultant glass or, as described below, by introducing a halogen-containing gas into the burner together with the glass raw material gases upon the glass synthesis to synthesize glass fine particles while conducting dehydration.

In addition, in the subsequent dehydrating step, the concentration of a dehydrating gas, heating temperature and heating time are adjusted so as to attain sufficient dehydration.

On the other hand, the Cl amount according to the invention can be attained by, for example, decreasing the Cl amount in the atmosphere in the case where a Cl-containing gas such as a chlorine gas ($Cl_2$) is used as a dehydrating gas, or by adding a large amount of F in the F-adding step to convert Si—Cl bond into Si—F bond.

As for conditions in the dehydration step, heat treatment is conducted at a temperature of 800 to 1200° C. in a halogen-containing atmosphere. As the halogen, halogen compounds such as $CF_4$, $C_2F_6$, $SiF_4$ and $Si_2F_6$ may be used as well as the Cl compounds such as $Cl_2$, $SOCl_2$ and $SiCl_4$. As other atmospheric gas, it is preferred to use, for example, a He gas.

In order for adding F to the glass of the invention, the glass fine particle deposit body is subjected to dehydration treatment, then heat treated in a F-containing atmosphere at a temperature of 1000 to 1500° C., followed by vitrification, alternatively, the glass is consolidated to vitrify while adding F. Examples of the F compound for use in the atmosphere in the F-adding step include, for example, $SiF_6$, $SF_6$, $CF_4$ and $C_2F_6$. As other atmospheric gases, those illustrated with respect to the dehydrating step may be used.

In the glass-vitrifying step, the glass may be heated to 1400 to 1500° C. in the F-containing atmosphere, as in the F-adding step, to vitrify, or alternatively, vitrification may be conducted in a F-free atmosphere (for example, atmosphere of He gas alone). In view of characteristic properties, it is preferred to vitrify in the F-containing atmosphere.

In the invention, another preferred embodiment of the process is that in which a gas of a F-containing compound is introduced together with the gas of raw materials of glass into the flame upon synthesis of a glass fine particle deposit body to thereby previously produce a glass fine particle deposit body having less content of OH group, then the deposit body is subjected to dehydration step under the condition of a decreased Cl amount, followed by addition of F and glass vitrification. As the F-containing compound, the same compounds as illustrated with respect to the F-adding step may be used.

The present invention will be illustrated in greater detail with reference to the following Examples, but the invention should not be construed as being limited thereto.

EXAMPLE 1

Figure 2:
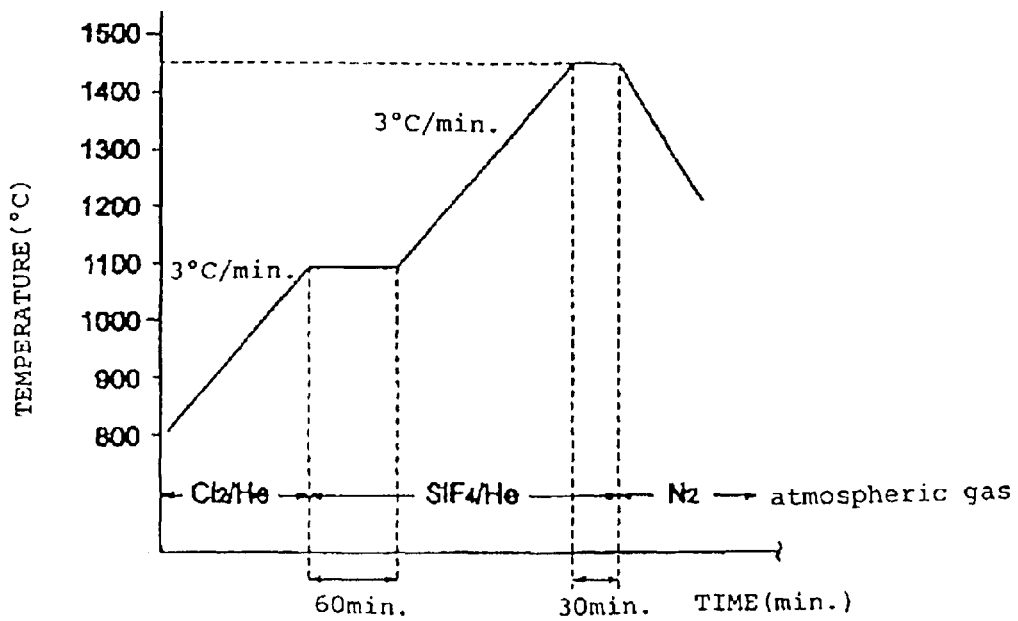
FIG. 2 is a schematic diagram showing conditions of dehydration step, F-adding step and vitrifying step employed in Examples 1 and 2 and Comparative Example 1 of the invention.

9 slm (liter/min) of a glass raw material gas of $SiCl_4$, 180 liters/min of $H_2$, 180 liters/min of $O_2$ and 20 liters/min of Ar were introduced into a concentric 12-fold pipe burner, and an $SiO_2$ soot (porous matrix) having a diameter of 150 mm and a length of 600 mm was synthesized according to flame hydrolysis method. This soot was retained in a uniformly heating furnace, and heated in an atmosphere comprising a He gas and a $Cl_2$ gas and having a Cl concentration of 0.5 mol at a rate of 3° C./min from 800 to 1100° C. to conduct dehydration treatment and, at 1100° C., the atmosphere was changed to a helium atmosphere containing 5 mol % of $SiF_4$ to thereby initiate the fluorine-adding treatment. After retaining for 60 minutes at the temperature, the temperature was raised at a rate of 3° C./min up to 1450° C. and, and then retained for 30 minutes at 1450° C. to vitrify (condition 1). The steps employed in Condition 1 are schematically shown in FIG. 2.

The thus obtained fluorine-containing glass of the invention (Example 1) was a transparent glass body. The OH group content was measured with a sample having a diameter of 25 mm and a thickness of 50 mm worked out from the transparent glass body. In addition, the degree of deterioration in transmittance after irradiation with $F_2$ laser (taking initial transmittance as 100%; hereinafter merely referred to as "degree of transmittance deterioration") was determined by measuring transmittance of a sample having a diameter of 25 mm and a thickness of 6.35 mm worked out from the transparent glass body, before and after irradiation with a $F_2$ laser, using VUV-200 (trade name) made by Nippon Densi K. K. Irradiation was conducted using a $F_2$ laser (wavelength: 157 nm) at an output power of 25 $\mu J/cm^2$ and $1.5 \times 10^9$ pulses. The results thus obtained are shown in Table 3 below.

Additionally, analysis of the composition of the transparent glass body was conducted as follows.

Measurement of OH Concentration

Conducted according to the method described in D. M. Dood and D. B. Fraser, "Optical determination of OH in fused silica", Journal of Applied Physics, vol. 37 (1996), p.3911 (Literature 4).

Measurement of Cl Concentration

A sample was dissolved in a HF aqueous solution, and the HF solution containing dissolved therein the sample was dropped on a Si wafer using a pipet and, after drying, quantitative analysis of Cl was conducted according to the whole reflection fluorescent X-ray analyzing method (measuring device: TREX610 (trade name) made by Technos).

Measurement of F Concentration

Conducted according to ion chromatography. First, 0.1 g of a sample silica glass and 1 g of sodium carbonate were pulverized and mixed, then heated to melt and, after cooling, ultra-pure water was added thereto to prepare an aqueous solution. This aqueous solution was passed through a cation exchange resin to separate away sodium ion, and fluoride ion in the passed solution was quantitatively measured according to ion chromatography.

EXAMPLES 2 AND COMPARATIVE EXAMPLE 1

Transparent glass bodies (Examples 2 and Comparative Example 1), obtained by subjecting the porous matrix prepared in the same manner as in Example 1 to condition 2 or 3 wherein the atmosphere of dehydrating step and the atmosphere of fluorine-adding and consolidating steps were changed as shown in Table 1, were measured with respect to concentrations of respective ingredients and degree of transmittance deterioration in the same manner as in Example 1. The results thus obtained are also shown in Table 3 and FIG. 1 below.

TABLE 1

|  | Dehydrating Atmosphere | Dehydrating Temperature | F-Adding Atmosphere | F-adding Temperature | Vitrifying Atmosphere | Vitrifying Temperature | Example |
| --- | --- | --- | --- | --- | --- | --- | --- |
| Condition 1 | 0.5% $Cl_2$/He | 1100° C. | 5% $SiF_4$/He | 1100–1400° C. | 5% $SiF_4$/He | 1450° C. | Example 1 |
| Condition 2 | 2% $Cl_2$/He | ditto | ditto | ditto | ditto | ditto | Example 2 |
| Condition 3 | 10% $Cl_2$/He | ditto | ditto | ditto | ditto | ditto | Comparative Example 1 |

As is apparent from Tables 1 and 3 and FIG. 1, when the Cl concentration in the dehydrating atmosphere becomes lower, the Cl concentration in the resultant glass becomes lower and the F/Cl ratio becomes larger, so that the degree of transmittance deterioration becomes smaller.

COMPARATIVE EXAMPLES 2 AND 3

Transparent glass bodies were obtained by subjecting the porous matrix prepared in the same manner as in Example 1 to condition 4 or 5 shown in Table 2 in place of condition 1. These transparent glass bodies thus obtained under the conditions of 4 and 5 (Comparative Examples 2 and 3, respectively) were measured with respect to concentrations of respective ingredients and degree (%) of transmittance deterioration in the same manner as in Example 1. The results thus obtained are also shown in the following Table 3 and FIG. 1.

TABLE 2

|  | Dehydrating Atmosphere | Dehydrating Temperature | F-Adding Atmosphere | F-adding Temperature | Vitrifying Atmosphere | Vitrifying Temperature | Example |
| --- | --- | --- | --- | --- | --- | --- | --- |
| Condition 4 | 10% $Cl_2$/He | 1100° C. | 0.3% $SiF_4$/He | 1100–1400° C. | 0.3% $SiF_4$/He | 1500° C. | Comparative Ex. 2 |
| Condition 5 | 0.5% $Cl_2$/He | ditto | ditto | ditto | ditto | ditto | Comparative Ex. 3 |

As is apparent from Tables 2 and 3, the glass of Comparative Example 2 had a less F content and a less F/Cl ratio, since condition 4 was employed wherein the concentration of the F-containing gas in the F-adding step is lower than that in condition 3, and suffered 2-fold or more deterioration of transmittance in comparison with the glass of Comparative Example 1.

In addition, according to condition 5, since the concentration of the F-containing gas in the F-adding step was lower than that in condition 1, conversion of Si—Cl bond into Si—F bond in the vitrifying step does not proceed sufficiently, thus smaller F/Cl ratio and inferior degree of transmittance deterioration being obtained.

In conditions 3 and 4, treatment was conducted employing a higher Cl concentration (10%). It is seen that, when a large amount of Cl remains in the glass soot, treatment in an atmosphere of a higher F concentration is necessary for sufficiently replacing Cl with F in the vitrifying step.

In conditions 1 and 5, treatment was conducted employing a lower Cl concentration (0.5%). It is seen that when the Cl concentration is at such a low level, replacement by F can be attained by treatment employing a lower F concentration, but the conversion into Si—F less proceeds at a F concentration of 0.3% (condition 5) than at a F concentration of 5% (condition 1), depending on which the amount of residual Cl increases.

EXAMPLE 3

Figure 3:
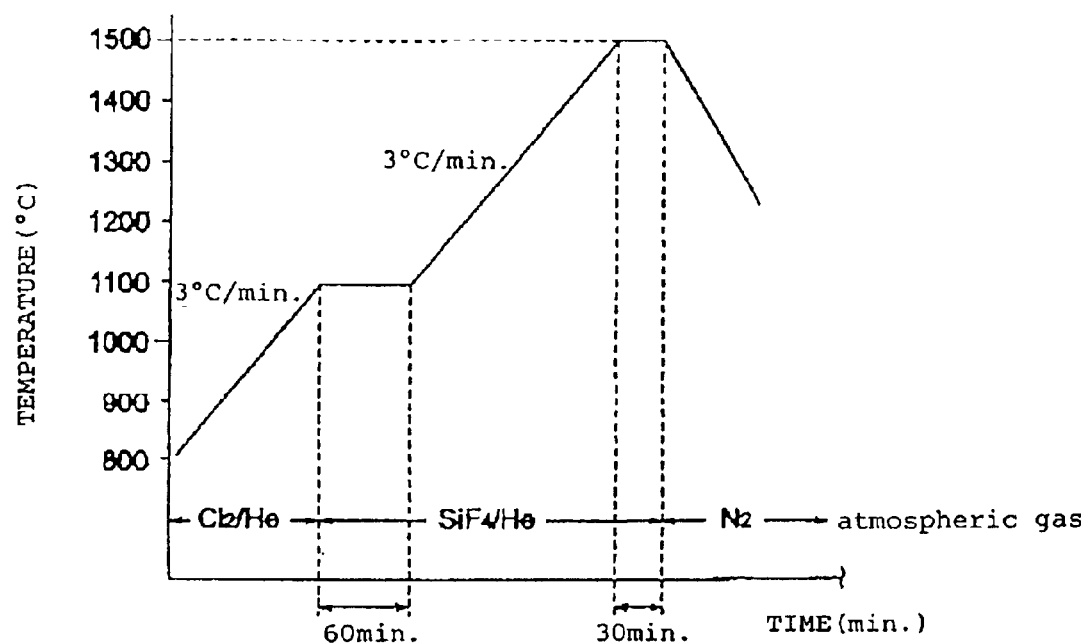
FIG. 3 is a schematic diagram showing conditions of dehydration step, F-adding step and vitrifying step employed in Comparative Examples 2 and 3 and Examples 3 and 4 of the invention.

3 slm of $C_2F_6$ was introduced into a burner together with a $SiCl_4$ gas of a glass raw material, and an F-containing $SiO_2$ porous matrix having a diameter of 150 mm and a length of 600 mm was synthesized according to flame hydrolysis method. Subsequent steps were conducted under the same conditions as condition 5 (employed in Comparative Example 3) to conduct dehydration, addition of fluorine and vitrification (condition 6). Atmosphere and temperature conditions in each step are schematically shown in FIG. 3. The transparent glass body (Example 3) thus obtained was measured with respect to concentrations of respective ingredients and degree (%) of deterioration of transmittance in the same manner as in Example 1. The results thus obtained are also shown in the following Table 3.

EXAMPLE 4

3 slm of $C_2F_6$ was introduced into a burner together with a $SiCl_4$ gas of a glass raw material, and an F-containing $SiO_2$ porous matrix having a diameter of 150 mm and a length of 600 mm was synthesized according to flame hydrolysis method. Subsequent steps were conducted under the same conditions as condition 5 (employed in Comparative Example 3) to obtain a transparent glass body (the same one as obtained in Example 3). This transparent glass body was exposed to a $H_2$ atmosphere at 500° C. and 200 atmospheric pressures for 2 weeks to thereby add $H_2$ to the glass body (condition 7). This treatment of adding $H_2$ converted Si—F bond into Si—OH bond. The transparent glass body (Example 4) to which $H_2$ had been added was measured with respect to concentrations of respective ingredients and degree (%) of deterioration of transmittance in the same manner as in Example 1. The results thus obtained are also shown in the following Table 3.

COMPARATIVE EXAMPLE 4

3 slm of $C_2F_6$ was introduced into a burner together with a $SiCl_4$ gas of a glass raw material, and an F-containing $SiO_2$ porous matrix having a diameter of 150 mm and a length of 600 mm was synthesized according to flame hydrolysis method. The resultant porous matrix was heated at 1600° C. in a He atmosphere to vitrify with omitting dehydration treatment and F-adding treatment (condition 8). The transparent glass body (Comparative Example 4) thus obtained was measured with respect to concentrations of respective ingredients and degree (%) of deterioration of transmittance in the same manner as in Example 1. The results thus obtained are also shown in the following Table 3.

Since the F compound gas was introduced into the burner upon synthesis of glass in Example 3, Cl concentration in the glass in Example 3 was lower than in Comparative Example 3, F concentration was higher than in Comparative Example 3, and the F/Cl ratio was three times as much as that in Comparative Example 3. Example 3 provided considerably good results with the degree of deterioration of transmittance being as low as 2%.

In Example 4, the transparent glass body obtained in the same manner as in Example 3 was treated with $H_2$, and hence OH concentration in the glass became as high as 10% which was the upper limit in the invention, whereas F concentration decreased, and F/Cl was 100. In spite of the F/Cl ratio, the result in the degree of transmittance deterioration obtained in Example 4 was as good as that in Example 3.

In Comparative Example 4, both dehydration step and the fluorine-adding treatment were omitted, and the concentration of OH group exceeded the scope of the invention, with the degree of deterioration of transmittance being as large as 8%.

TABLE 3

| Example | Producing Condition | Concentration of Ingredients in Glass (SiO$_2$) | | | | Degree of Deterioration in Transmittance (%) at 157 nm after Irradiation with F$_2$ Laser |
| --- | --- | --- | --- | --- | --- | --- |
| | | OH Concentration (ppm) | Cl Concentration (ppm) | F Concentration (ppm) | F/Cl Concentration Ratio | |
| Ex. 1 | Condition 1 | <1 | 1 | 10000 | 10000 | 0.5 |
| Ex. 2 | Condition 2 | <1 | 10 | 10000 | 1000 | 1.0 |
| Com. Ex. 1 | Condition 3 | <1 | 100 | 10000 | 100 | 4.0 |
| Com. Ex. 2 | Condition 4 | <1 | 100 | 2000 | 20 | 10.0 |
| Com. Ex. 3 | Condition 5 | <1 | 20 | 2000 | 100 | 6.0 |
| Ex. 3 | Condition 6 | <1 | 10 | 3000 | 300 | 2.0 |
| Ex. 4 | Condition 7 | 10 | 10 | 1000 | 100 | 2.0 |
| Com. Ex. 4 | Condition 8 | 100 | 10 | 1000 | 100 | 8.0 |
| Ex. 5 | Condition 9 | <1 | 0.1 | 1000 | 10000 | 0.3 (0.5*) |

*Degree of transmittance deterioration when irradiated at an output power of 1 mJ/cm$^2$ and 5.2 × 10$^6$ pulses.

It is seen from the results of Examples 1 to 4 and Comparative Examples 1 to 4 that in order to control the degree of transmittance deterioration at a wavelength of 157 nm to be less than 4%, it is necessary to adjust the F/Cl (concentration ratio) to be not lower than 100, the OH concentration to be not higher than 10 ppm, the Cl concentration to be not higher than 10 ppm and the F concentration to be not lower than 1000 ppm. Moreover, in order to control the degree of transmittance deterioration at a wavelength of 157 nm to be less than 1%, it is necessary to adjust the F/Cl (concentration ratio) to be not lower than 1000, the OH concentration to be not higher than 10 ppm, the Cl concentration to be not higher than 10 ppm and the F concentration to be not lower than 1000 ppm.

EXAMPLE 5

Figure 4:
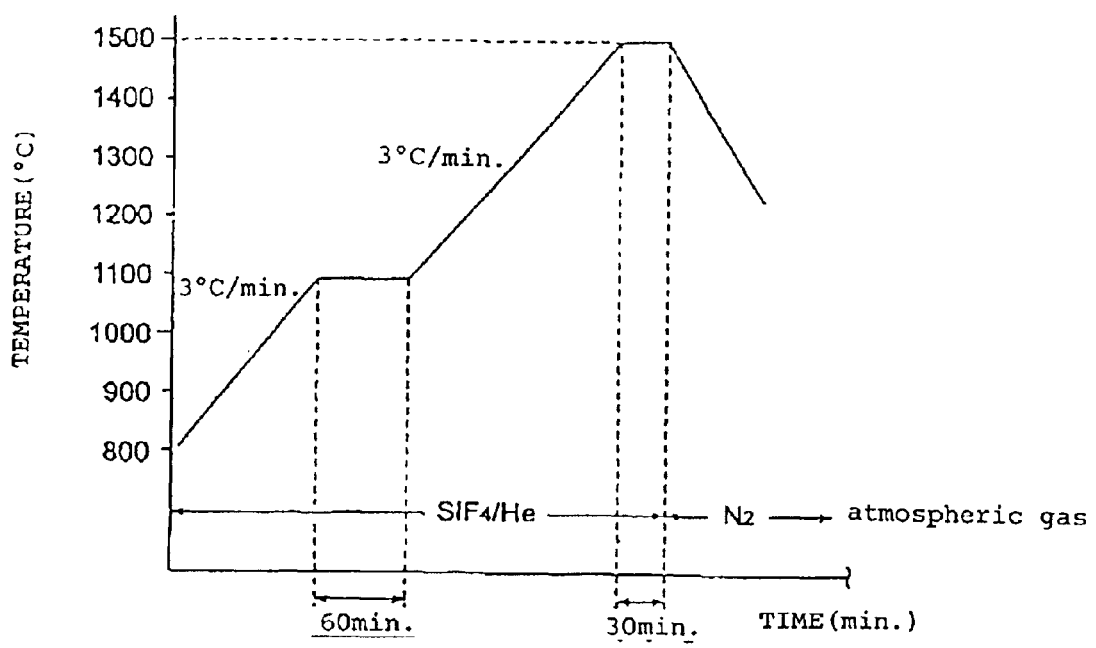
FIG. 4 is a schematic diagram showing conditions of dehydration step, F-adding step and vitrifying step employed in Example 5 of the invention.

An SiO$_2$ soot (porous matrix) having a diameter of 150 mm and a length of 600 mm was synthesized in the same manner as in Example 1. This soot was retained in a uniformly heating furnace, and heated in a He atmosphere having a SiF$_4$ molar concentration of 5% at a rate of 3° C./min from 800 to 1100° C. After retaining for 60 minutes at the temperature, the temperature was raised at a rate of 3° C./min up to 1450° C. and, and then retained for 30 minutes at the temperature to vitrify. The conditions as to the atmosphere and temperature used in the above-described steps (condition 9) are schematically shown in FIG. 4.

The transparent glass body thus obtained was measured with respect to concentrations of respective ingredients and degree (%) of transmittance deterioration in the same manner as in Example 1. The results thus obtained are also shown in the foregoing Table 3.

Additionally, the transmittance deterioration characteristic was also evaluated by changing the conditions such that irradiation was conducted using a F$_2$ laser (wavelength: 157 nm) at an output power of 1 mJ/cm$^2$ and 5.2×10$^6$ pulses. The results thus obtained are also shown in Table 3.

As can be seen from Table 3, the degree of the transmittance deterioration was sufficiently suppressed at a low level with respect to both of the above irradiation conditions.

Furthermore, it can be understood from the results of Example 5 that the effect of suppressing the transmittance deterioration becomes greater with a less Cl concentration.

As has been described hereinbefore, glass molecules can be ended with F (terminated with Si—F) by adjusting the amount of OH group, the amounts of F and Cl and the F/Cl ratio to specific ranges, thereby transmittance properties in UV region and vacuum UV region and laser resistance of the resultant glass being markedly improved.

Since the silica glass articles of the invention have improved resistance against radiation of UV region, vacuum UV region and, in particular, against a F$_2$ excimer laser of 157 nm in wavelength, they are extremely advantageous in the field of optical devices, parts, working machines and photolithography substrates utilizing this radiation.

While the invention has been described in detail and with reference to specific embodiments thereof, it will be apparent to one skilled in the art that various changes and modifications can be made without departing from the spirit and scope thereof.

What is claimed is:

1. A process for producing fluorine-containing glass, comprising the steps of:
   synthesizing an SiO$_2$ soot by hydrolyzing SiCl$_4$; and
   heating said SiO$_2$ soot in a chlorine-compound-free atmosphere comprising at least fluorine compound gas to thereby obtain fluorine-containing glass, wherein said fluorine-containing glass comprises silica and contains, in said silica, not more than 10 ppm of OH group, not more than 10 ppm of Cl, and not less than 1000 ppm of F, and fluorine-containing glass having a concentration ratio of F/Cl of 10,000 or more.

2. The process of claim 1 wherein the maximum limit of the F/Cl ratio is 300,000.

* * * * *